(12) United States Patent
Barts

(10) Patent No.: US 8,884,839 B2
(45) Date of Patent: Nov. 11, 2014

(54) AMPLIFIED TELEVISION ANTENNA

(71) Applicant: Robert Michael Barts, Raleigh, NC (US)

(72) Inventor: Robert Michael Barts, Raleigh, NC (US)

(73) Assignee: Greenwave Scientific, Inc., Raleigh, NC (US)

( * ) Notice: Subject to any disclaimer, the term of this patent is extended or adjusted under 35 U.S.C. 154(b) by 196 days.

(21) Appl. No.: 13/690,628

(22) Filed: Nov. 30, 2012

(65) Prior Publication Data

US 2013/0176190 A1   Jul. 11, 2013

Related U.S. Application Data

(60) Provisional application No. 61/584,444, filed on Jan. 9, 2012.

(51) Int. Cl.
*H01Q 1/00* (2006.01)
*H01Q 1/50* (2006.01)
*H04N 5/38* (2006.01)
*H04N 21/418* (2011.01)

(52) U.S. Cl.
CPC .............. *H01Q 1/50* (2013.01); *H04N 21/4183* (2013.01); *H04N 5/38* (2013.01)
USPC ........................................... 343/905; 343/906

(58) Field of Classification Search
USPC .................................... 343/905, 906; 439/916
See application file for complete search history.

(56) References Cited

U.S. PATENT DOCUMENTS 6,211,844 B1 *  4/2001  Davi et al. ..................... 343/876
7,602,289 B2 * 10/2009  Ashizawa et al. .......... 340/572.1
7,783,270 B1 *  8/2010  Haab et al. .................. 455/127.1

* cited by examiner

*Primary Examiner* — Tan Ho
(74) *Attorney, Agent, or Firm* — Neal Wolgin; Tillman Wright PLLC

(57) ABSTRACT

An amplified television antenna system is disclosed that receives its power from a non-dedicated source such as a Universal Serial Bus (USB) connection. The USB connection that powers the amplified television antenna can be made with any USB device such as a television, a television receiver, a desktop computer, a laptop computer, a game console, or a USB AC wall adaptor.

6 Claims, 4 Drawing Sheets

AMPLIFIED TELEVISION ANTENNA

CROSS-REFERENCE TO RELATE APPLICATION

The present application is a U.S. nonprovisional patent application of, and claims priority under 35 U.S.C. §119(e) to, U.S. provisional patent application Ser. No. 61/584,444 filed Jan. 9, 2012, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention generally relates to television antennas and methods for making the same, and in particular to amplified television antennas that are externally powered. The television antenna of the present invention may be used in any number of applications, including without limitation to provide amplified over-the-air ("OTA") signals to a television tuner.

2. Background

A need exists for improvement in the field of externally powered amplified television antennas to reduce the number of components used to manufacture such antennas as well as the number of components that must be installed by a consumer to use such antennas. This and other needs are addressed by one or more aspects of the present invention.

External television antennas have been available for many years, including roof-top type antennas and set-top type antennas. In general, an external antenna is useful in areas of weak signal coverage, or to improve the reception of signals using a built-in television antenna. Prior art antennas may also include a signal amplifier that requires external power to operate. Television manufacturers have changed their products to meet current demand. Over time, there has been an increase in the percentage of television owners that subscribe to cable television or satellite television. With the introduction of digital television for terrestrial broadcast, television manufacturers have generally eliminated internal television antennas from their products. Cable and satellite subscribers do not need an internal antenna; however an external antenna is required in order to receive over-the-air (OTA) broadcasts. By using an antenna amplifier, it is possible to receive a greater number of OTA channels. There is also demand from cable and satellite subscribers for external antennas as many cable and satellite systems do not carry local television stations.

While there are many ways to provide power to an external antenna, the most common method is to use a dedicated external "power brick" (either an external switching power supply or an AC transformer with an output rectifier) to supply low voltage DC current to an amplifier. In one type of prior art external antenna, the antenna element may be located some distance from the amplifier, but is connected to the amplifier by a coaxial cable. The amplifier, generally located near the television, is in turn connected to the television by a second coaxial cable. The power brick is also connected to the amplifier by a relatively short low voltage cable to supply power from the power brick.

In another type of prior art external antenna, the amplifier is either integrated into the antenna element housing, or co-located with the antenna element. A power injector circuit is used to provide power to the amplifier. The combined amplifier/antenna element may be located some distance front the power injector circuit, but is connected to the power injector circuit by a coaxial cable. The power injector circuit is generally located near the television, and is in turn connected to the television by a second coaxial cable. The power injector circuit is connected to the power brick by a relatively short low voltage cable to supply power from the power brick. The power injector circuit sends power to the amplifier over the first coaxial cable, and prevents power from reaching the television through the second coaxial cable.

A major drawback of both prior art external antennas is that the antenna amplifier remains powered on whether or not the television is powered on, thereby creating waste heat and wasting energy. There exists a need in the marketplace for an externally powered antenna that does not require a dedicated external power brick and that is powered on and off with the television to which it is attached.

SUMMARY OF THE PRESENT INVENTION

Broadly defined, the present invention according to one aspect is an external television antenna that is powered on and off with the television (or other device) to which it is attached. In a feature of this aspect, the external antenna has an integral amplifier that is powered by a power injector circuit that is in turn powered by the television (or other device) to which it is attached.

In another aspect of the present invention, the external antenna is connected to a separate amplifier that is powered by the television (or other device) to which it is in turn attached.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

One or more preferred embodiments of the present invention will now be described in detail with reference to the accompanying drawings, wherein the same elements are referred to with the same reference numerals.

DETAILED DESCRIPTION

Figure 1:
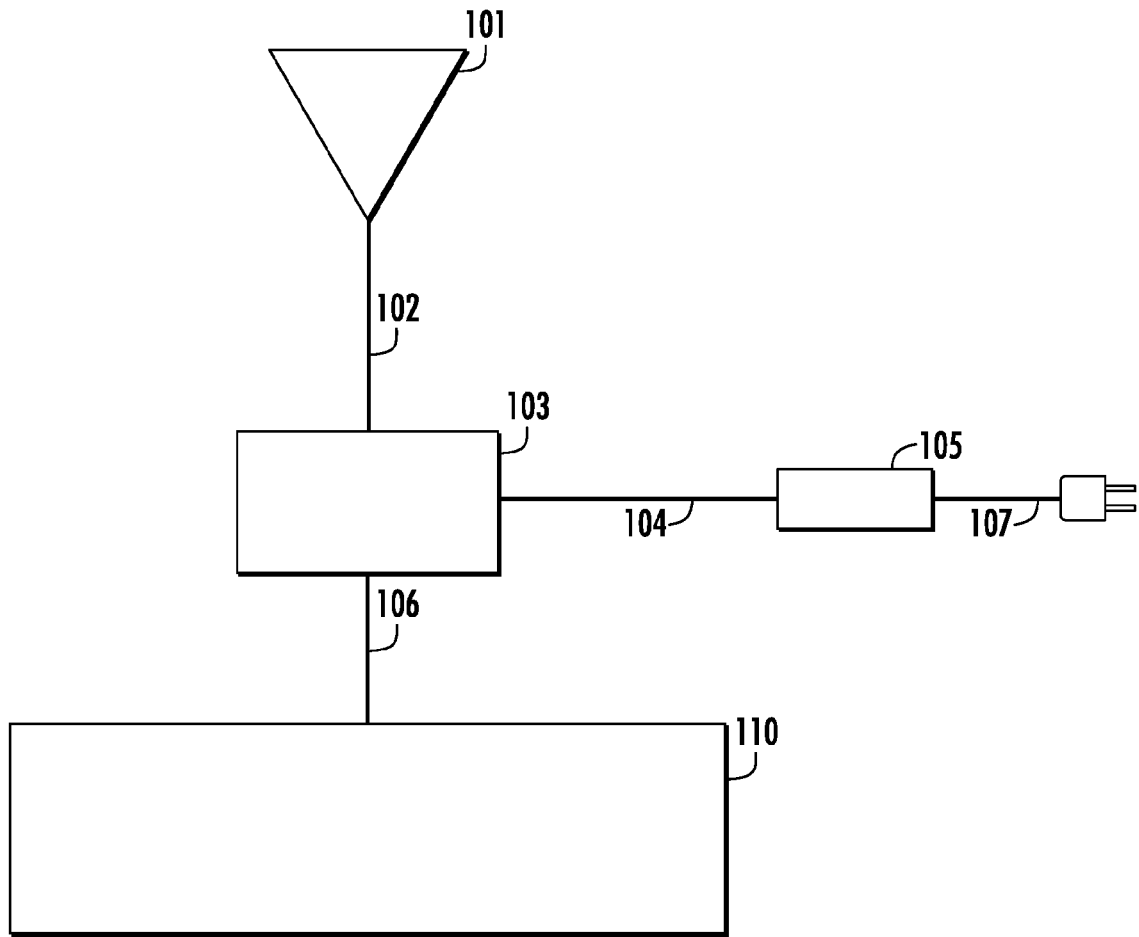
FIG. 1 illustrates a prior art television antenna system with an amplifier and a power supply circuit located remotely from the antenna element.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended to, nor is to be construed to, limit the scope of patent protection afforded the present invention, which scope is to be defined by the claims arid the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning, of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "'step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiments is merely exemplary in nature and is in no way intended to limit the invention, its implementations, or uses.

Description Of The Prior Art

FIG. 1 illustrates a prior art television antenna system with an amplifier and a power supply circuit located remotely from the antenna element. The prior art antenna system consists of an antenna element 101, an amplifier with integral power circuit 103, and power brick 105. Power brick 105 plugs into an AC power outlet using power cord 107, and generates a low voltage DC current that is fed to amplifier 103 using cable 104. The antenna element 101 receives over-the-air ("OTA") television signals, and passes the received signal to the amplifier 103 using coaxial cable 102. The integral power circuit portion of amplifier 103 provides power to the amplifier to amplify the received signal, and the amplifier then feeds the amplified signal to a television receiver 110 using coaxial cable 106. The amplifier 103, power brick 105, and television receiver 110 are generally located in close proximity to each other, while the antenna element 101 may be located some distance away from amplifier 103, power brick 105, and television receiver 110. This allows antenna element 101 to be placed in a position where reception of OTA signals may be optimized. In this prior art system, the power brick 105 generates power, and the amplifier 103 remains in a powered state, regardless of whether the television receiver 110 is powered on. This results in Waste heat being generated since energy is being consumed by the amplifier (as well as power conversion losses in the power brick 105) all of the time regardless of how often the television receiver is used.

Figure 2:
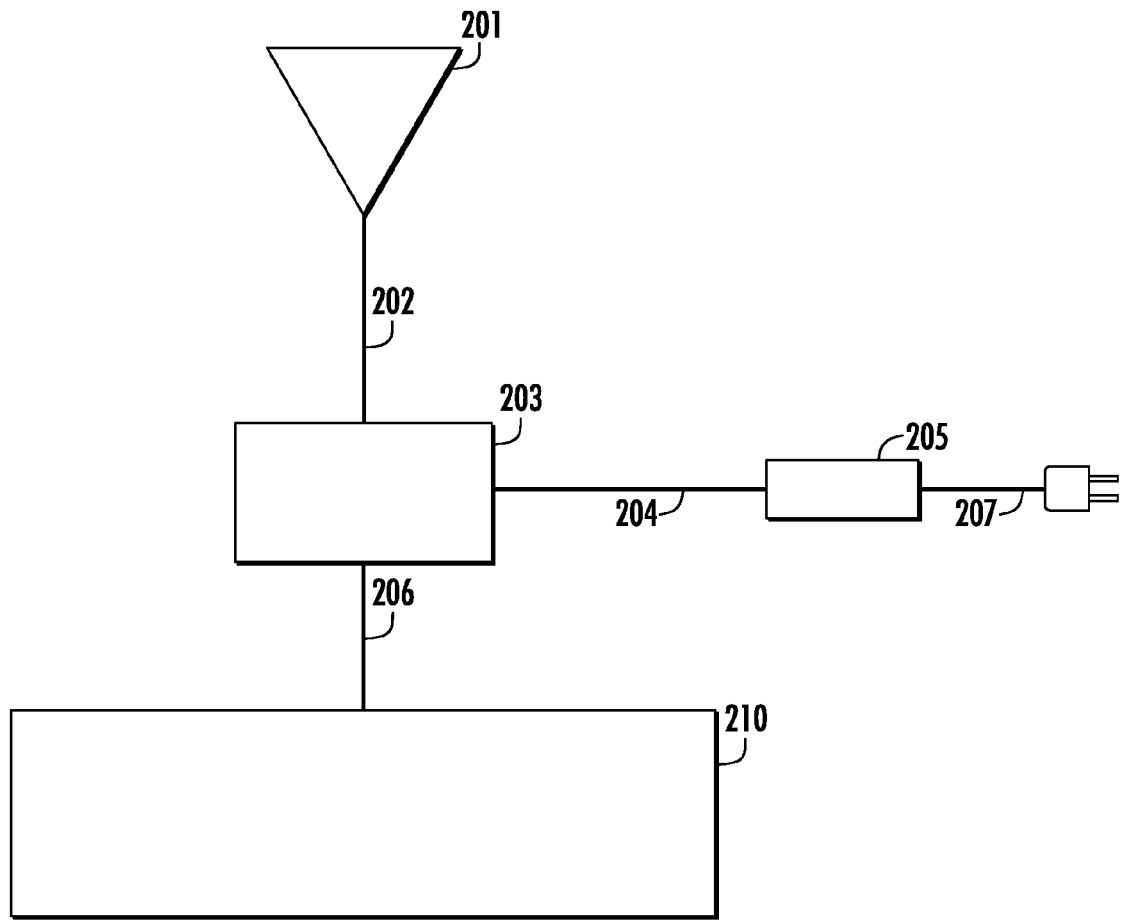
FIG. 2 illustrates a prior art television antenna system with an amplifier co-located with the antenna element and a power supply circuit located remotely from the antenna element.

FIG. 2 illustrates a prior art television antenna system with an amplifier co-located with the antenna element and a power supply circuit located remotely from the antenna element. The prior art antenna system consists of an antenna element with an integrated power amplifier 201, a power injector circuit 203, and power brick 205. Power brick 205 plugs into an AC power outlet using power cord 207, and generates a low voltage DC current that is fed to power injector circuit 203 using cable 204. The antenna element 201 receives over-the-air ("OTA") television signals, and passes the OTA signal to the integrated amplifier portion of antenna element 201. The power injector circuit 203 sends a DC current to antenna element with integral amplifier 201 using coaxial cable 202. The amplifier portion of antenna 201 sends an amplified OTA signal to television receiver 210 using coaxial cables 202 and 206. The power injector circuit 203 is suitably enabled to pass the amplified OTA signal from antenna 201 to television receiver 210. The power injector circuit 203, power brick 205, and television receiver 210 are generally located in close proximity to each other, while the antenna element 201 may be located some distance away from power injector circuit 203, power brick 205, and television receiver 210. This allows antenna 201 to be placed in a position where reception of OTA signals may be optimized. In this prior art system, the power brick 205 generates power, and the amplifier portion of antenna 201 and the power injector circuit 203 remain in a powered state, regardless of whether the television receiver 210 is powered on. This results in waste heat being generated since energy is being consumed by the amplifier and power injector circuit (as well as power conversion losses in the power brick 205) all of the time regardless of how often the television receiver is used.

Description Of The Present Invention

In accordance with one or more preferred embodiments of the present invention, a television antenna system includes an amplifier that is powered on and off by the television receiver that the antenna system is connected to. While a television receiver is referred to below, it is understood that the antenna of the present invention is suitably enabled to work with any type of display device.

Figure 3:
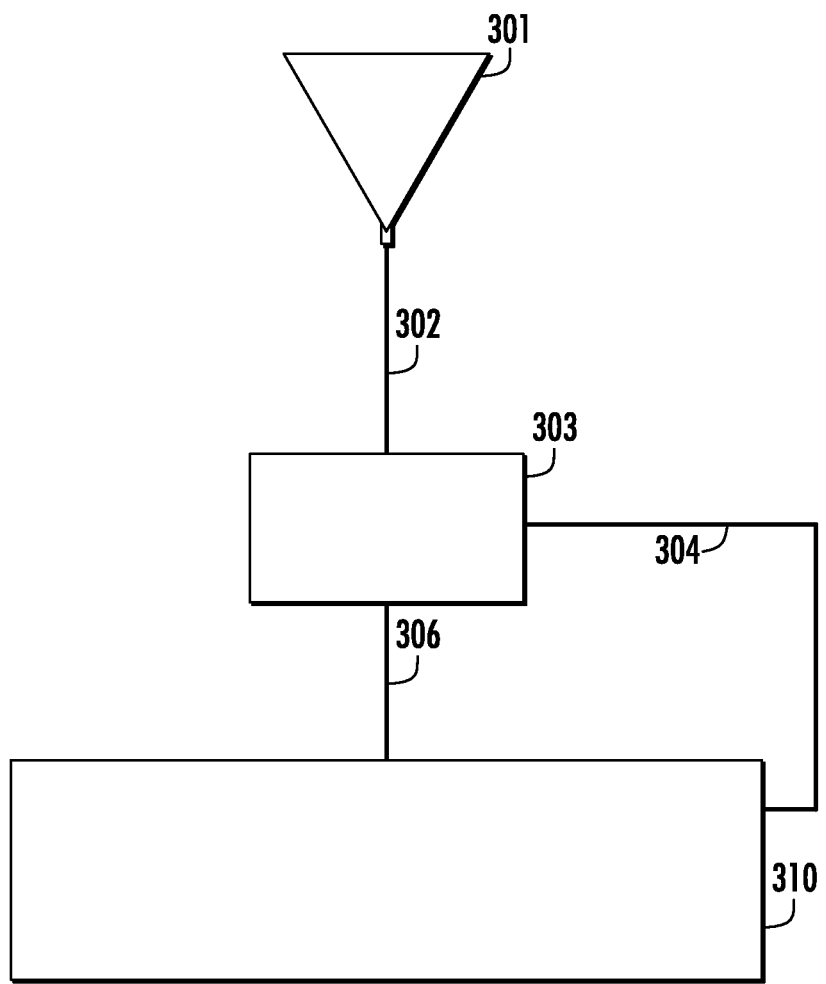
FIG. 3 illustrates an antenna system of the present invention with an amplifier co-located with the antenna element and a power injector circuit located remotely from the antenna element.

FIG. 3 illustrates an antenna system of the present invention with an amplifier co-located with the antenna element and a power supply circuit located remotely from the antenna element. The antenna system of the present invention consists of an antenna element with an integrated power amplifier 301, and a power injector 303. The power injector 303 receives DC current from a display device such as television receiver 310 through cable 304. The antenna element of the combined antenna element with an integrated power amplifier 301 receives OTA television signals, and passes the received signal to the amplifier portion of antenna element 301. The power injector 303 passes a DC current to amplifier 301 using coaxial cable 302. The amplifier 301 amplifies the receive OTA signal, and then feeds the amplified signal to a television receiver 310 using coaxial cables 302 and 306. The power injector 303 is suitably enabled to pass the amplified OTA signal from antenna 301 to television receiver 310. The power injector 303 and television receiver 310 are generally located in close proximity to each other, while the antenna element with integrated power amplifier 301 may be located some distance away from power injector circuit 303 and television receiver 310. This allows antenna 301 to be placed in a position where reception of OTA signals may be optimized. In the present invention, the television receiver 310 only provides power to the power injector 303 when the television receiver 310 is powered on. The system of the present invention therefore results in no waste heat or wasted energy associated with powering the amplifier 301, and no power losses in association with power injector 303. The power injector 303 also contains all necessary power regulation components and filtering components required to convert the incoming supply voltage to the voltage required by the amplifier 301 and filter the radio frequency ("RF") signals and DC signals appropriately. In one embodiment of the present invention, the power source from television receiver 310 is from a Universal Serial Bus ("USB") interface, and cable 304 is a conventional USB cable.

Figure 4:
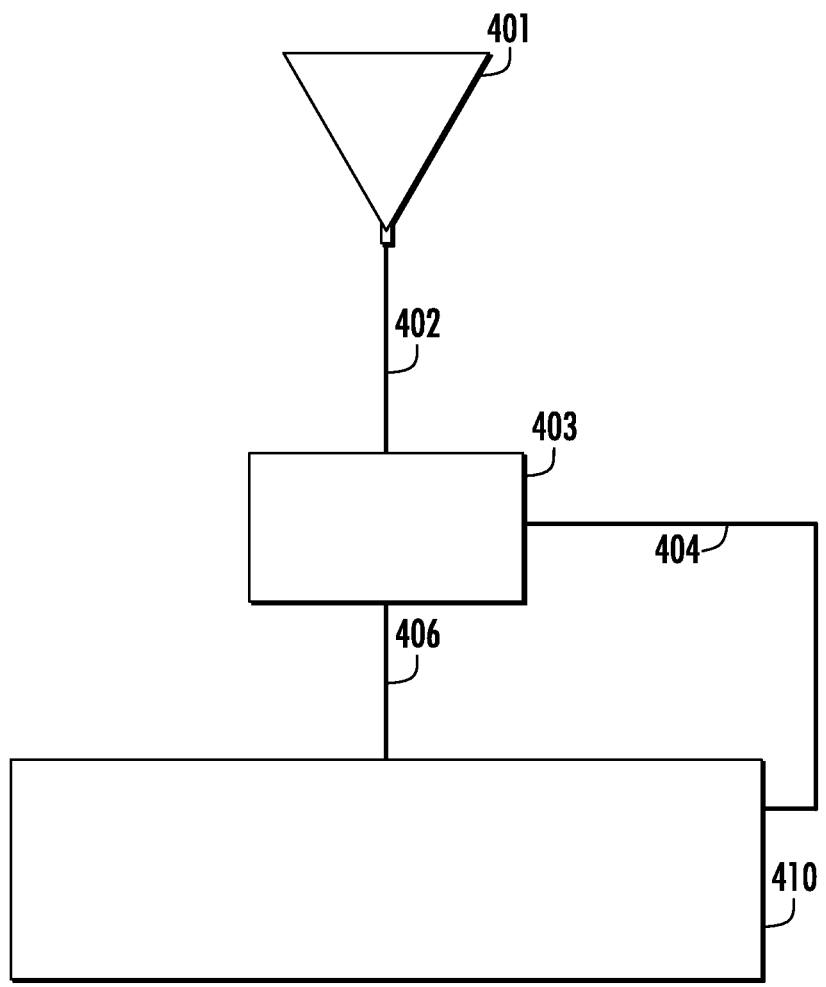
FIG. 4 illustrates an antenna system of the present invention with an amplifier and a power supply circuit located remotely from the antenna element.

FIG. 4 illustrates an antenna system of the present invention with an amplifier co located with the antenna element and a power supply circuit located remotely from the antenna element. The antenna system of the present invention consists of an antenna element 401, an amplifier with integral power circuit 403, and power cable 404. Power cable 404 plugs into a port on a display device such as television receiver 410. The antenna element 401 receives OTA television signals, and passes the received signal to the amplifier 403 using coaxial cable 402. The integral power supply circuit portion of amplifier 403 provides power to the amplifier to amplify the received signal, and the amplifier then feeds the amplified signal to a television receiver 410 using, coaxial cable 406. The amplifier 403 and television receiver 410 are generally located in close proximity to each other, while the antenna element 401 may be located some distance away from amplifier 403 and television receiver 410. This allows antenna element 401 to be placed in a position where reception of OTA signals may be optimized. In the present invention, the television receiver 410 only provides power to the power supply circuit 403 when the television receiver 310 is powered on. The system of the present invention therefore results in no waste heat or wasted energy associated with powering the amplifier 403, and no power losses in association with the power supply circuit. The power supply circuit portion of amplifier 403 also contains all necessary power regulation components and filtering components required to convert the incoming supply voltage to the voltage required by the amplifier and filter the RF signals and DC signals appropriately. In one embodiment of the present invention, the power source from television receiver 410 is from a USB interface, and cable 404 is a conventional USB cable.

The display device used in connection with the antenna system of the present invention may be any one of a number of USB devices that are capable of supplying power such as a television, a computer, a laptop, a game console, etc. The antenna system of the present invention is more energy efficient, while also eliminating the need for a separate power brick and its associated AC and DC cables as well as the need for a nearby AC outlet.

What is claimed is:

1. A antenna system for providing amplified over-the-air television signals to a display device, comprising:
    an OTA antenna element;
    an amplifier co-located with said OTA antenna element;
    a power injector suitably enabled to receive an amplified signal from an amplifier and further enabled to deliver an amplified signal to a display device;
    a power cable to connect said power injector to a power source; and
    a coaxial cable connecting said antenna element and co-located amplifier to said power injector, and a second coaxial cable to connect said power injector to a display device.

2. The antenna system of claim 1 wherein the power source for said power injector is a display device.

3. The antenna system of claim 2 wherein the power source is a USB port.

4. A antenna system for providing amplified over-the-air television signals to a display device, comprising:
    an OTA antenna element;
    an amplifier;
    a power supply circuit integrated with said amplifier;
    a power cable to connect said power supply circuit of said amplifier to a power source; and
    a coaxial cable connecting said antenna element to said amplifier, and a second coaxial cable to connect said amplifier to a display device.

5. The antenna system of claim 4 wherein the power source for said power supply circuit of said amplifier is a display device.

6. The antenna system of claim 5 wherein the power source is a USB port.

* * * * *